(12) United States Patent
Limbeck

(10) Patent No.: US 8,841,040 B2
(45) Date of Patent: Sep. 23, 2014

(54) METHOD TO COLD-START FUEL CELL SYSTEM AT SUB-ZERO TEMPERATURES

(75) Inventor: Uwe Limbeck, Kirchheim (DE)

(73) Assignee: NuCellSys GmbH, Kirchheim/Teck-Nabern (DE)

( * ) Notice: Subject to any disclaimer, the term of this patent is extended or adjusted under 35 U.S.C. 154(b) by 1796 days.

(21) Appl. No.: 10/588,645

(22) PCT Filed: Feb. 4, 2005

(86) PCT No.: PCT/US2005/003357
§ 371 (c)(1), (2), (4) Date: May 15, 2007

(87) PCT Pub. No.: WO2005/078840
PCT Pub. Date: Aug. 25, 2005

(65) Prior Publication Data
US 2007/0224462 A1    Sep. 27, 2007

Related U.S. Application Data

(60) Provisional application No. 60/570,052, filed on May 11, 2004.

(30) Foreign Application Priority Data

Feb. 6, 2004  (DE) .................. 10 2004 005 935

(51) Int. Cl.
*H01M 8/02* (2006.01)
*H01M 8/04* (2006.01)
*H01M 8/10* (2006.01)

(52) U.S. Cl.
CPC ...... *H01M 8/04253* (2013.01); *H01M 8/04022* (2013.01); *Y02E 60/521* (2013.01); *H01M 8/04268* (2013.01); *H01M 8/04007* (2013.01); *H01M 8/10* (2013.01); *H01M 8/04223* (2013.01); *H01M 8/04067* (2013.01); *H01M 2300/0082* (2013.01)
USPC ........... 429/429; 429/432; 429/434; 429/441; 429/442; 429/454

(58) Field of Classification Search
USPC ......... 429/12, 20, 13, 23, 26, 32, 34, 38, 429, 429/432, 434, 441, 442, 454
IPC ................................................. H01M 8/04,8/00
See application file for complete search history.

(56) References Cited

U.S. PATENT DOCUMENTS 3,976,507 A * 8/1976 Bloomfield .................... 429/17
5,798,186 A   8/1998 Fletcher et al.
(Continued)

FOREIGN PATENT DOCUMENTS

EP    1113516 A1 * 7/2001 .............. H01M 8/04
EP    A-1 113 516    7/2001
(Continued)

OTHER PUBLICATIONS

German-language Office Action dated May 30, 2014 (Four (4) pages).

Primary Examiner — Jun Li
(74) Attorney, Agent, or Firm — Crowell & Moring LLP

(57) ABSTRACT

In a method to cold-start a fuel cell system at sub-zero temperatures, the fuel cell system comprises a fuel cell stack, upstream of which is connected a heating device to heat a cooling agent to be circulated by a coolant pump. To reduce the demand for stored electrical energy, the cold fuel cell stack is operated at such a capacity that it generates power that is sufficient only to operate the heating device and the coolant pump. The power generated by the fuel cell stack is used to operate the heating device for heating the cooling agent as well as the coolant pump, whereby the coolant pump circulates the cooling agent between the fuel cell stack and the heating device. The heating device is switched off as soon as the fuel cell stack reaches a preset temperature that is higher than the original temperature.

19 Claims, 1 Drawing Sheet

(56) References Cited

U.S. PATENT DOCUMENTS

| | | |
|---|---|---|
| 6,068,941 A | 5/2000 | Fuller et al. |
| 6,127,056 A | 10/2000 | Wheeler et al. |
| 6,495,277 B1* | 12/2002 | Edlund et al. ............ 429/22 |
| 2003/0124399 A1* | 7/2003 | Amrhein et al. ............ 429/19 |
| 2003/0203258 A1* | 10/2003 | Yang et al. ............ 429/25 |
| 2004/0157094 A1* | 8/2004 | Reiser et al. ............ 429/13 |

FOREIGN PATENT DOCUMENTS

| | | |
|---|---|---|
| JP | 63 236262 A | 10/1988 |
| WO | WO 97/48142 A1 | 12/1997 |
| WO | WO 2004/073133 A2 | 8/2004 |

* cited by examiner

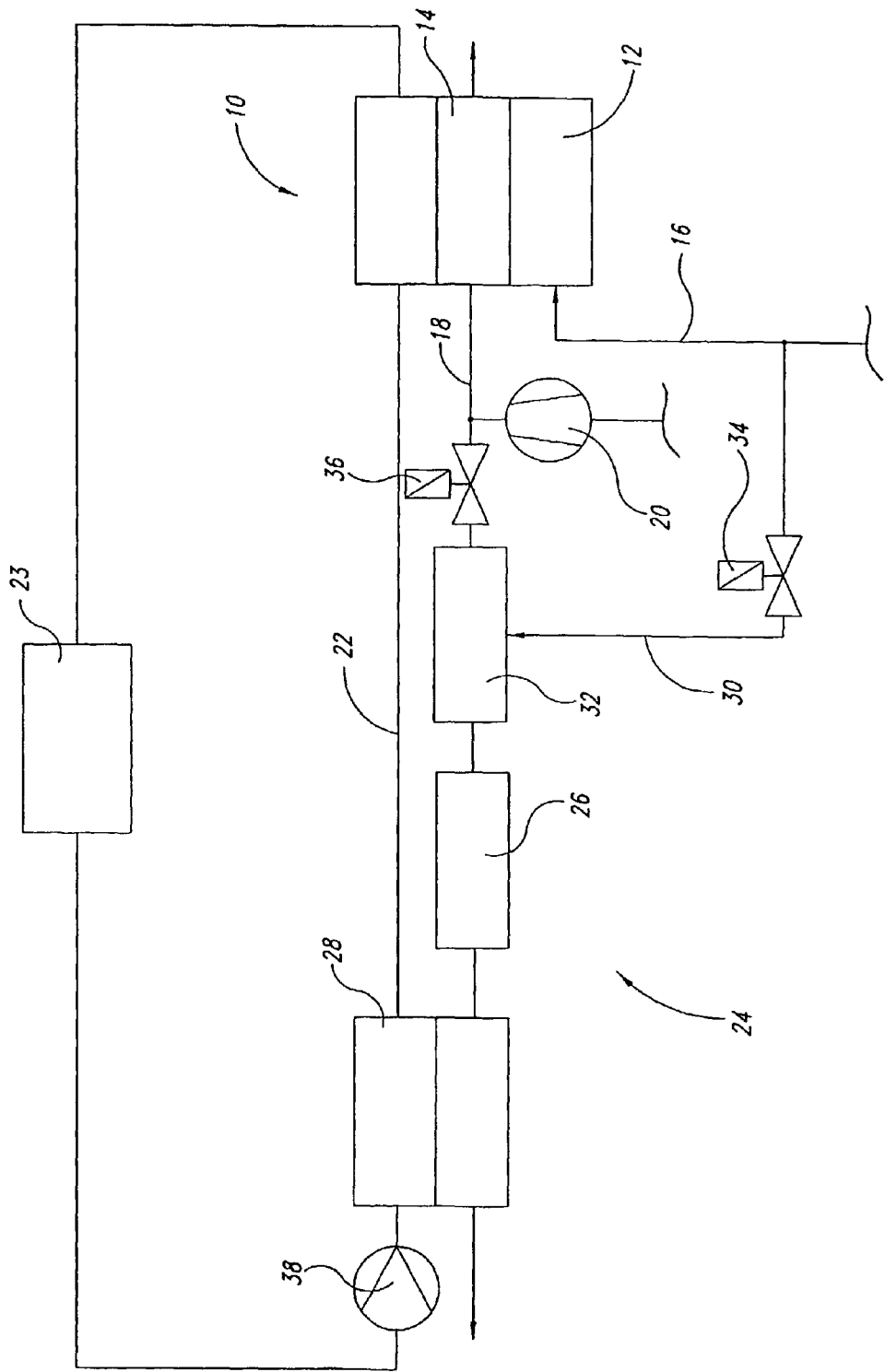

METHOD TO COLD-START FUEL CELL SYSTEM AT SUB-ZERO TEMPERATURES

This application claims the priority of German patent document 203 029.4, filed Feb. 6, 2004 (PCT International Application PCT/US2005/003357, filed Feb. 4, 2005), the disclosure of which is expressly incorporated by reference herein.

The present invention concerns a method to cold-start a fuel cell system at sub-zero temperatures.

BACKGROUND OF THE INVENTION

One general problem of fuel cell systems is their start-up at low temperatures, i.e., at temperatures significantly below 0° C. For example, if a fuel cell system is to be started at a temperature of −15° C., one first uses a heating device associated with the fuel cell system to heat the fuel cell system (in particular its stack of membrane-electrode assemblies) to a temperature of, for example, +5° C., and only then starts the fuel cell system. This is based on the consideration that the fuel cell system must first be heated to a temperature above which the water generated by the fuel cell system can no longer freeze, since freezing would create problems. The heating device may comprise a burner to generate the required thermal energy, whereby the burner may, for example, be operated with hydrogen that is also used as fuel for the fuel cell system. The heat generated by the burner may be used to heat a cooling fluid, which circulates in a coolant loop that serves to cool the fuel cell stack during the subsequent operation of the fuel cell stack. The coolant heated by the burner of the heating device circulates in the coolant loop and in this manner transfers the thermal energy to the fuel cell stack to preheat the fuel cell stack.

The above-described pre-heating process must be completed in as short a time period as possible, so that the fuel cell system can be started as quickly as possible, even at low ambient temperatures. During this pre-heating process, a significant amount of heat has to be transferred to the coolant in a short time period. This in turn means that a corresponding air flow has to be supplied to the burner, which can be accomplished only with the help of a powerful fan or a compressor. For this reason, the overall electrical power required prior to the actual start of the fuel cell system is very high, since it is necessary to operate not only the above-mentioned fan or compressor, but also the coolant circulating pump and a control unit that controls the heating process. Since normally the fuel cell stack does not generate any power during the heating process, the required electrical power is generally provided by a correspondingly large battery. This is undesirable for weight- and space-related reasons, in particular for mobile fuel cell applications.

SUMMARY OF THE INVENTION

One objective of the invention is to provide an improved method for the cold-starting of a fuel cell system with lower battery energy requirements.

This and other objects and advantages are achieved by the method according to the invention, which starts a fuel cell system with a fuel cell stack and a heating device connected upstream of the fuel cell stack to heat a cooling agent to be circulated by a coolant pump. The cold fuel cell stack is operated at a capacity that generates enough power to operate the heating device and the coolant pump. The power generated by the fuel cell is used to operate the heating device for heating the coolant and the coolant pump for circulating the coolant between the fuel cell stack and the heating device; and the heating device is switched off as soon as the fuel cell stack has reached a preset temperature that is higher than the original temperature.

The invention is based on the capability of a fuel cell system to run at sub-zero temperatures, at least under low load conditions and for a short period of time. It has been known that fuel cell systems can generate power at sub-zero temperatures (see, e.g., U.S. Pat. No. 5,798,186), but it is also known that prolonged operation at sub-zero temperatures can lead to problems, such as ice formation in the lines for the reactant streams. For this reason, it was widely assumed that the fuel cell stack itself is not really suitable as a power source during the cold-start of a fuel cell system. In contrast, it has been found that even under such conditions, the fuel cell stack is able to deliver an amount of power that is at least sufficiently large to operate the heating device, preferably even to operate the coolant pump and an air compressor. An important factor is the fact that the fuel cell stack can provide this amount of power over a time period that is long enough to heat it to a temperature above zero before ice formation sets in. Thus, a battery or other energy source is needed only for the actual starting of the fuel cell system, and the battery can be much smaller than conventionally thought, since immediately after the below-zero start-up of the fuel cell stack, the fuel cell stack will provide power.

Preferably, the method according to the invention is implemented in such a way that the fuel cell system will be operated at a capacity that is just barely sufficient to provide the power necessary to operate the heating device, the coolant pump, and possibly necessary auxiliaries.

A further advantage of the method according to the invention is that the fuel cell stack generates heat immediately after its start-up at sub-zero temperatures, which results in more rapid heating, and thus a shorter waiting period before the fuel cell system can provide full power.

Even an interruption of the start-up process, which usually takes approximately one minute, is no problem for the invention, since according to the invention the cold fuel stack can be operated at low load for a duration of several minutes, which allows three to four successive start-up processes using the method according to the invention.

In one embodiment of the method according to the invention, the preset temperature is +5° C. (i.e., the heating device of the fuel cell system is switched off when the fuel cell stack has reached a temperature of +5° C.). But it should be understood that other preset temperatures can be used according to the invention, if they are sufficiently high to allow the fuel cell system to reach its operating temperature without additional external heat input. The present assumption in this regard is that for fuel cell systems with solid polymer electrolytes these preset temperatures must be above the freezing point, preferably close to or above +5° C.

In preferred embodiments of the method according to the invention, the heating device is a burner. This burner may, for example, be fuelled with hydrogen, which is advantageous since the fuel cell stack also requires hydrogen for its operation. If the heating device is a burner, then the process of operating the cold fuel cell stack at low load to generate the required power is implemented so that sufficient power is generated to operate the auxiliaries necessary for the operation of the burner (starting device of the burner, fan or compressor for air supply, etc.). Of course, there also has to be sufficient power to operate the coolant pump.

The method according to the invention can realize cost advantages if a burner serves as the heating device, since neither the burner nor the heat exchanger (or heat exchangers)

needs be rigorously designed for the lowest possible pressure loss, as has been the case traditionally in order to keep the electrical power needed to operate the heating device prior to the actual start-up of the fuel cell system as low as possible. For this reason, according to the invention, both the burner and the heat exchanger (or heat exchangers) can be smaller and thus less expensive and more compact.

If a burner serves as the heating device, the method according to the invention can realize further advantages by employing one and the same air compressor to supply both the fuel cell stack and the burner with oxygen. This reduces the power requirements even further.

If in the method according to the invention one employs one and the same air compressor to supply air to both the burner and the fuel cell stack, then the air volume delivered by the air compressor may be divided between the burner and the fuel cell in a ratio that favors the burner. In one embodiment, this ratio is 4:1.

One may use a high-performance gas burner as the burner for the method according to the invention. Such a high-performance gas burner can deliver in a short amount of time the significant amount of heat that has to be transferred to the cooling agent. In one embodiment, the high-performance gas burner has a power output in a range of approximately 30 kW to 90 kW. Depending on the desired burner output, a burner of this type requires an air mass flow rate of between approximately 50 kg/hr and 300 kg/hr during operation. As mentioned before, hydrogen may be used to operate the burner.

Thus the present invention overall provides a significantly improved method for cold-starting a fuel cell system at sub-zero temperatures, in which the desired short "start-up times" can be achieved despite the lower battery-power requirements and lower space requirements for the smaller components. As used herein, the term "start-up time" refers to the time required for the fuel cell stack of a cold fuel cell system to be able to deliver its full power.

Other objects, advantages and novel features of the present invention will become apparent from the following detailed description of the invention when considered in conjunction with the accompanying drawings.

BRIEF DESCRIPTION OF THE DRAWINGS

The single FIGURE illustrates a fuel cell stack with a heating device that is connected upstream thereof or integrated therein.

DETAILED DESCRIPTION OF THE INVENTION

Referring to the FIGURE, a fuel cell stack 10 with one anode 12 and one cathode 14 are disclosed. Hydrogen is supplied to the anode 12 from a source (not shown) via a line 16. Via a line 18, the cathode 14 is supplied with oxygen in the form of air, which has been compressed by a compressor 20. During its operation, the fuel cell stack 10 uses the supplied hydrogen and oxygen to produce power and water in a manner which is known in the art (and therefore will not be explained in more detail).

For the purpose of cooling the fuel cell stack 10 during its operation, it is connected in a heat-exchanging manner to a cooling loop 22, which includes a heat exchanger 23 in the form of a radiator, to dissipate the excess heat that is produced during the operation of the fuel cell stack 10. The cooling loop 22 also has a heat-exchanging connection to a heating device 24, which supplies heat to the cooling agent circulating in the cooling loop 22 during the start-up phase, so that the fuel cell stack 10 can be heated more rapidly to operating temperature from very low ambient temperatures.

In the illustrated embodiment, the heating device 24 comprises a high-performance gas burner 26 that is operated with hydrogen and produces hot gas, whereby an additional heat exchanger 28 is used to transfer the thermal energy of the hot gas to the cooling agent circulating in the cooling loop 22. The gas burner 26 is supplied with hydrogen via a line 30, which branches off the line 16. In a mixer 32 upstream of the gas burner 26, hydrogen is mixed with the particular volume of air (delivered by the compressor 20 via line 18) that is necessary to achieve proper combustion. Control valves 34 and 36 effect the desired distribution of the hydrogen flow and the air flow between the fuel cell stack 10 and the gas burner 26 or mixer 32. In a preferred embodiment of the invention, the air volume is divided between the burner and the fuel cell stack with a ratio that favors the burner; for example, a ratio of 4:1.

A coolant pump 38 circulates the cooling agent through the cooling loop 22. As shown in the FIGURE, the cooling loop 22 typically is a closed loop. In the shown embodiment example, the heat exchanger 23 used to cool the cooling agent during operation is separate from the heat exchanger 28 that is used to heat the cooling agent during the start-up phase, but it is also possible for the heat exchangers 23 and 28 to employ common components or to be integrated into each other.

The illustrated arrangement operates as follows. At first the compressor 20 is started with the help of a battery (not shown) and the hydrogen supply via the line 16 is opened, so that air and hydrogen are fed to the fuel cell stack 10. The fuel cell stack 10 commences operation and is set by its control system to operate at low load, e.g., at approximately 10% of its rated power. The power generated by the fuel cell stack 10 is now used to drive the compressor 20, the coolant pump 38, and all auxiliaries necessary for the operation of the heating device 24 and the fuel cell stack 10. The heating device 24 (in particular, its gas burner 26) is started and the hot gas generated by its heats the cooling agent in the cooling loop 22, which is circulated through the cooling loop 22 by the coolant pump 38. In this operating state, the heat exchanger 23 is not operating. (That is, either it is not supplied with cooling agent or the cooling agent circulating in the cooling loop 22 is carried past the heat exchanger 23, for example, by means of a bypass line (not shown) that bypasses the heat exchanger 23.

As soon as the fuel cell stack 10 has reached the temperature required for normal operation (for example, +5° C.), the gas burner 26 is switched off and the fuel cell stack 10 can be operated at a higher load, or at full load, if required. In this operating state the cooling loop 22 serves its actual purpose, namely cooling the fuel cell stack 10 by means of the heat exchanger 23.

The following is an example of the application of the method of the present invention in a fuel cell system which includes a polymer-electrolyte-membrane fuel cell stack with an output power of approximately 85 kW. This fuel cell stack can be operated for approximately 3 to 4 minutes at −15° C. and at a load of approximately 5% to 10% of its nominal output power (i.e., with an output power of approximately 4 to 7 kW), before problems occur due to ice formation or similar factors.

According to the method of the invention, the fuel cell system needs only a quantity of heat sufficient to heat the fuel cell stack from −15° C. to a temperature from which it can reach its operating temperature on its own, without outside help. In the fuel cell systems in this example, this temperature was assumed to be +5° C. to be able to carry out three to four subsequent start-up processes in rapid succession, each of the start-up processes has to be completed in less than approximately 1 minute.

To heat the fuel cell stack from −15° C. to +5° C., it is necessary to introduce a computed quantity of heat between 1800 and 2200 kJ into the cooling agent. It is desirable to transfer this amount of heat to the cooling agent within approximately 40 seconds, so that during the remaining 20 seconds the cooling agent can transfer the absorbed heat to the actual fuel cell stack. The listed requirements translate into a power of approximately 45 to 55 kW, which the burner must be able to generate and the heat exchanger must be able to transfer. For the burner to generate this quantity of heat, approximately 20 kg/hr of air has to be carried to the burner and subsequently to the heat exchanger. Assuming that an additional 3 to 50 kg/hr of air has to be supplied to the fuel cell stack during the same time period in order for the fuel cells tack to generate the required electrical power, the compressor must be able to deliver a flow of approximately 230 to 250 kg/hr during the start-up process. Dependent on the pressure gradient that the compressor has to produce, this corresponds to approximately 2 to 5 kW of electrical power that must be supplied to the compressor. Added to this must be the electrical power of approximately 800 W required by the coolant pump and the approximately 500 W that is needed by additional loads, such as sensors, control systems, etc., so that the fuel cell stack has to generate approximately 3½ to 6½ kW of electrical power during the start-up process.

As explained above, the fuel cell stack is able to generate an output power of this level already during the start-up process, which makes it possible to use a smaller starter battery. A starter battery that needs only to be able to start the fuel cell stack requires an output power of not more than 1.5 kW for less than 5 seconds, whereas a battery that must also provide power during a cold-start process has to be able to provide a power output of at least approximately 6 kW for up to 60 seconds. A 1.5 kW battery is significantly smaller and less expensive than a 6 kW battery, and further evidences an advantage of this invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method to cold-start a fuel cell system at subfreezing temperatures, the fuel cell system having a fuel cell stack upstream which is connected a heating device to heat a cooling agent to be circulated by a coolant pump, said method comprising:
   during a start-up time, at an ambient temperature that is below a temperature at which the fuel cell stack is capable of sustaining a normal operation, operating the fuel cell stack at an output power that is adequate to operate the heating device and the coolant pump;
   using the power provided by the fuel cell stack to operate the heating device for heating the cooling agent, as well as the coolant pump;
   circulating the cooling agent between the fuel cell stack and the heating device; and
   shutting off the heating device when the fuel cell stack has reached a preset temperature that is higher than the original temperature; wherein,
   the fuel cell system includes a starter battery;
   the starter battery is dimensioned such that it has an output capacity that is only able to supply electrical power to start the fuel cell system, until the fuel cell itself generates electrical power, wherein the output capacity of the starter battery is no greater than 1.5 kW, for less than five seconds;
   in a first stage the starter battery initially supplies power to the auxiliaries necessary for the supply of reactants to the fuel cell stack; and
   initial power supply is interrupted when the fuel cell stack generates electrical power.

2. The method of claim 1, wherein the heating device is a burner.

3. The method of claim 2, wherein the preset temperature is at least 0 degrees Celsius.

4. The method of claim 2, wherein the preset temperature is at least +5 degrees Celsius.

5. The method of claim 2, wherein the fuel cell stack is operated until the preset temperature has been reached, at a capacity that does not exceed 10% of the nominal output power of the fuel cell system.

6. The method of claim 2, wherein power is provided from the fuel cell stack to auxiliary devices for the operation of the burner.

7. The method of claim 2, wherein the burner is operated with hydrogen.

8. The method of claim 2, wherein an air compressor is used to supply oxygen to the fuel cell stack and to the burner.

9. The method of claim 8, wherein an air volume provided by the air compressor is divided between the burner and the fuel cell stack, with a ratio that favors the burner.

10. The method of claim 9, wherein the air volume provided by the air compressor is divided between the burner and the fuel cell stack with a 4:1 ratio.

11. The method of claim 2, wherein the burner is a high-performance gas burner.

12. The method of claim 2, wherein the fuel cell stack is a sold-polymer-electrolyte fuel cell stack.

13. A method to cold-start a fuel cell system at sub-zero temperatures, the fuel cell system having a fuel cell stack upstream of which is connected a heating device to heat a cooling agent to be circulated by a coolant pump and which is equipped with a starter battery, said method comprising the following steps:
   supplying power from the starter battery to auxiliaries necessary for the supply of reactants to the fuel cell stack, wherein the starter battery is dimensioned such that it has an output capacity that is only able to supply electrical power to start the fuel cell system, until the fuel cell itself generates electrical power, wherein the output capacity of the starter battery is no greater than 1.5 kW, for less than five seconds;
   interrupting this initial power feed to the auxiliaries when the fuel cell stack generates electrical power;
   using the power provided by the fuel cell stack to operate the heating device for heating the cooling agent as well as the coolant pump, and circulating the cooling agent between the fuel cell stack and the heating device; and
   shutting off the heating device when the fuel cell stack has reached a preset temperature that is higher than an original temperature.

14. The method of claim 13, wherein the heating device is a burner.

15. The method of claim 14, wherein the fuel cell stack is operated until the preset temperature has been reached, at a capacity that does not exceed 10% of the nominal output power of the fuel cell system.

16. The method of claim 14, wherein power is provided from the fuel cell stack to auxiliary devices for the operation of the burner.

17. The method of claim 14, wherein an air compressor is used to supply oxygen to the fuel cell stack and to the burner.

18. The method of claim 17, wherein an air volume provided by the air compressor is divided between the burner and the fuel cell stack, with a ratio that favors the burner.

19. The method of claim 18, wherein the air volume provided by the air compressor is divided between the burner and the fuel cell stack with a 4:1 ratio.

* * * * *